(12) United States Patent
Faibis

(10) Patent No.: US 7,923,693 B2
(45) Date of Patent: Apr. 12, 2011

(54) SCINTILLATOR-BLOCK CAPABLE OF EFFICIENT ABSORPTION OF X-RAY ENERGY

(76) Inventor: Aurel A. Faibis, Sytrya (IL)

( * ) Notice: Subject to any disclaimer, the term of this patent is extended or adjusted under 35 U.S.C. 154(b) by 127 days.

(21) Appl. No.: 12/426,229

(22) Filed: Apr. 18, 2009

(65) Prior Publication Data

US 2010/0264318 A1    Oct. 21, 2010

(51) Int. Cl.
*G01T 1/20*    (2006.01)
(52) U.S. Cl. ............... 250/368; 250/361 R; 250/367
(58) Field of Classification Search ........... 250/361 R, 250/367, 368
See application file for complete search history.

(56) References Cited

U.S. PATENT DOCUMENTS

2004/0042585 A1*  3/2004  Nagarkar et al. ............ 378/98.8
2008/0192891 A1*  8/2008  Mori et al. .................... 378/62

OTHER PUBLICATIONS

Bambynek Walter et al, "X-Ray Fluorescence Yields, Auger, and Coster-Kronig Transition Probabilities", Review of Modern Phycis, vol. 44 No. 4, 716-813 (1972).

* cited by examiner

*Primary Examiner* — David P Porta
*Assistant Examiner* — Mark R Gaworecki

(57) ABSTRACT

The present invention describes scintillator-elements for use in X-ray detectors, the elements being shaped to ensure maximum absorption of the energy carried in by X-ray photons and to provide high position-resolution. Arrangements of such scintillator-elements in arrays and detector-systems comprising a plurality of arrays are described.

10 Claims, 6 Drawing Sheets

Figures 2A, 2B:
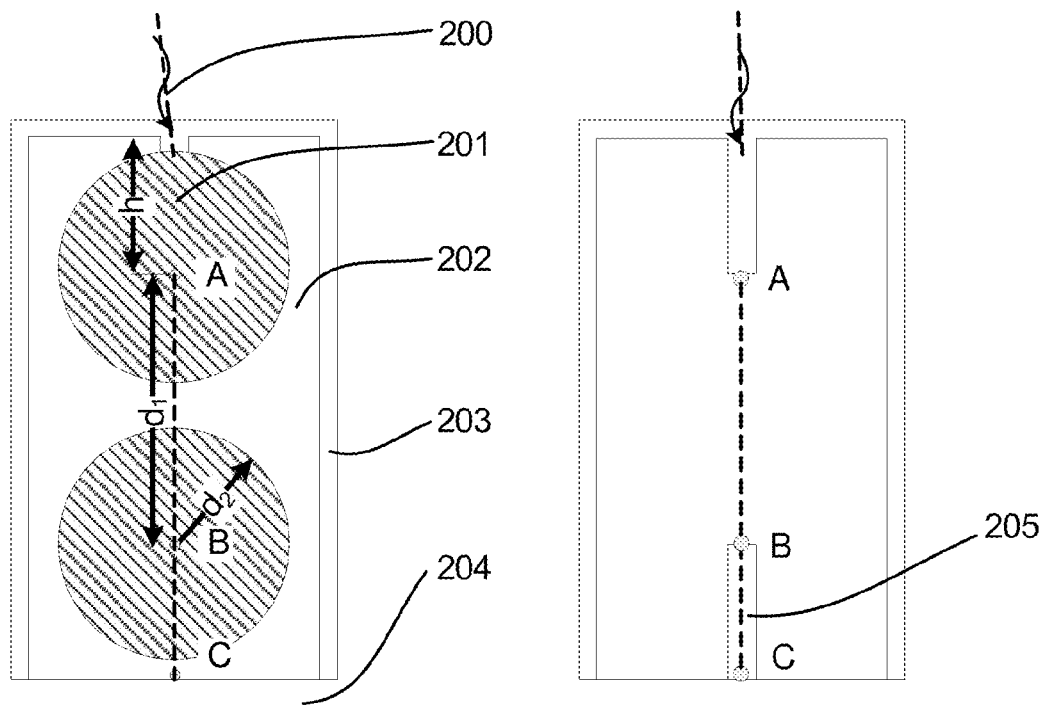

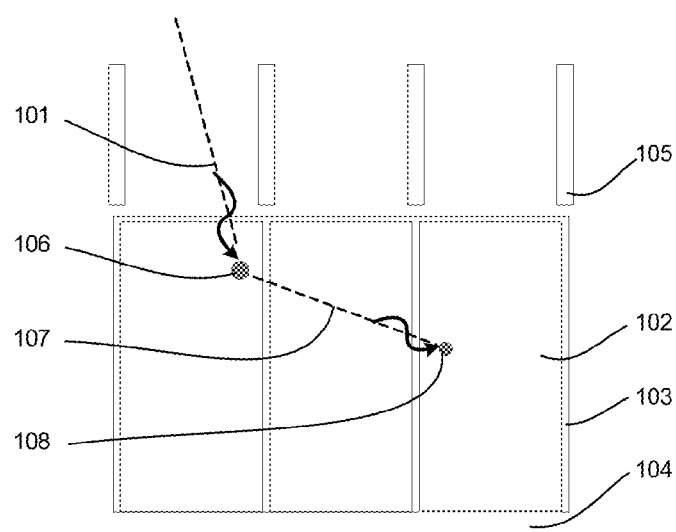
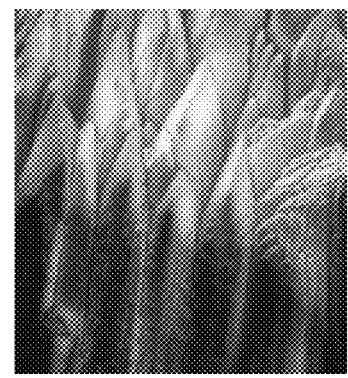
FIGURE 1A
FIGURE 1B

SCINTILLATOR-BLOCK CAPABLE OF EFFICIENT ABSORPTION OF X-RAY ENERGY

FIELD OF THE INVENTION

This application deals with scintillator-based (indirect-conversion) X-ray detectors and in particular with an improved scintillator-block design.

BACKGROUND OF THE INVENTION

In order to better recognize the benefits and the weaknesses of scintillator-based X-ray detectors one must understand some of the aspects of the interactions between X-rays and atoms.

The most favored interaction-mechanism between the X-ray photon and the scintillator is photoelectric scattering where X-ray absorption is immediately followed by emission of a fluorescence-photon. The attenuation-coefficient for fluorescence-photons is significantly lower than the attenuation-coefficient for photons of energy slightly above the K-shell energy, such that the locations where the X-ray photon and the associated fluorescence-photon are stopped may be hundreds of microns apart.

A large body of information on the photoelectric scattering and competing channels can be found in the paper by Walter Bambinek et. al published in the Review of Modern Physics, vol. 44, N. 4, October 1972.

Following the interaction between an X-ray photon and scintillator atoms a significant fraction of the X-ray photon-energy is converted into visible-photons. A photodiode is usually attached to one of the scintillator-walls and generates an electrical-signal when struck by visible-photons. The signal is further processed by electronic-circuitry to obtain a pulse whose amplitude is a measure of the energy deposited in the specific scintillator-volume by the detected X-ray photons.

Most X-ray detectors are designed to achieve: efficient X-ray absorption, high geometric fill-factor and high position-resolution. To reach better and better position-resolution one chooses to use smaller scintillator-elements (pixels). Modern detectors may display pixels of width as small as 0.05 mm.

The fraction of the X-ray energy converted into visible-photons close to the location of the first interaction is directed towards the attached photodiode by thin light-reflecting septa or by the columnar structure of the scintillator. The fluorescence-photon energy will often be deposited in another pixel (the signal-sharing effect) or may be lost if the fluorescence-photon escapes the scintillator.

The immediate damage is twofold: first the electrical-pulse associated with X-ray detection is not an accurate measure of the photon-energy and, second, an electrical-signal is generated in a neighboring pixel as the fluorescence-photon is stopped there.

To demonstrate the negative impact of signal-sharing on image quality, consider the use of a CsI (T1) detector in medical-imaging applications. The energy distribution of X-ray photons leaving the human-body, under typical radiographic-imaging conditions, peaks close to 60 keV. Given that each fluorescence-photon in CsI (T1) carries about 30 keV, and that about 50% of the fluorescence-photons are stopped in a typical 0.2 mm pixel, roughly half of the energy associated with detection of an X-ray photon is deposited outside the pixel where the impinging photon is stopped. The result is a significant reduction in image-contrast.

Some detection-systems, like the Medipix-3 system developed at CERN, use sophisticated electronics-circuitry to identify all signals generated by a single X-ray photon, within a given time-interval, in adjacent pixels. The system then estimates the original interaction-location and the X-ray photon energy. The complexity of this approach prevents its implementation in commercial equipment.

SUMMARY OF THE INVENTION

According to the present invention there is provided a scintillator-block designed to retain most of the energy carried-in by the detected X-ray photon and therefore capable to provide substantially accurate information on the X-ray photon energy.

The basic detector-unit comprised of this scintillator-block, the attached visible-light detector (photodiode) and the associated electronic circuitry provides significant advantages for both integrating-type and single-photon counting detectors.

Ways to incorporate such scintillator-blocks into arrays capable of efficient X-ray detection, high energy-resolution and high position-resolution are disclosed too.

DRAWINGS DESCRIPTION

The present invention will be better understood from the description given below and the accompanying drawings which are provided by way of illustration only.

FIG. 1A

The figure displays basic scintillator-blocks in existing detectors. The scintillator material 102 of each scintillator-block is surrounded by a thin layer of reflective material 103 and attached to a photodiode 104. Often an antiscatter-grid 105 is placed above the detector to prevent scattered photons from reaching the scintillator. The trajectory of an impinging X-ray photon is indicated by the dashed line 101. The photon interacts with the scintillator at location 106. Here a fluorescence-photon is emitted and propagates along direction 107 until it is stopped at location 108, within a different scintillator-block.

FIG. 1B

This is the image of a typical column-grown scintillator. The columns guide visible-photons towards the photodiode underneath.

FIG. 2A

This is a section through the basic scintillator-block disclosed in this invention. The scintillator-material 202 is coated or surrounded by a thin layer of light-reflecting material 203 and attached to a photodiode 204. The photon 200 enter the cavity 201 that extends from the top surface for a distance $h \geq d_2$. The minimum path-length required for efficient absorption of the radiation passing through the cavity is $d_1$, from A to B. Scintillator-regions reserved for the absorption of the fluorescence-photon are indicated for two extreme situations: the original-interaction occurs at A or, respectively, at B. Each region is indicated as a sphere of radius $d_2$.

FIG. 2B

Illustration of a scintillator-element provided with an additional cavity 205 placed at the exit end of the AB path.

FIG. 3A

Illustration of a preferred embodiment. The scintillator-block height "H" and width "W" are indicated in the drawing. A plate 305 made of X-ray absorbing material is placed above the scintillator. The plate is provided with an opening of width "w" arranged in registration with the cavity 301. The cavity width and depth are "w" and "h" respectively. The scintillator-material 302 is surrounded by the light-reflecting coating 303 and is attached to the photodiode 304.

FIG. 3B

This is a 3D drawing of the scintillator-block; the cut that allows a clearer view of the cavity. The photodiode can be attached to anyone of the block-delimiting surfaces, however it is beneficial to attach the photodiode to one of the lateral-surfaces or to the bottom-surface and thus protect it from damage by unmediated interaction with the incoming X-ray flux.

FIG. 4

This is an illustration of a preferred arrangement of scintillator-blocks. Scintillator-elements are shown from above. Cavities may have a square-shaped or circular-shaped cross-section, as beneficial to the application. Scintillator-elements are arranged with their projections along the y-axis being either adjacent or slightly overlapping. Imaging is achieved as this assembly performs a translational motion along the x-direction.

FIG. 5

This figure describes the process of generating an image by using a set of scintillator-blocks arranged as a square-array. The image pixels are "w" by "w" in size, where "w" is the cavity width. Since the scintillator-block width "W" is larger than the cavity width "w", one is able to estimate only the image-values associated with a subset of pixels, the black ones in the figure, in a single exposure. The array performs a scanning motion and, in successive exposures performed past every small displacement "w" a scintillator-block acquires the information that is associated with a group of image-pixels. The scintillator-block shown in the figure generates pixel-values in succession for pixels 1 to 9.

FIG. 6

Illustration of a preferred embodiment with scintillator-elements arranged in arrays. In this embodiment two detector-arrays are placed one above the other such that channels or voids between scintillator-blocks in the upstream layer are in registration with cavities in the scintillator-blocks of the downstream layer. Thus, photons 601 enter the cavities of the upstream-layer scintillator-blocks and participate in generating one image, while photons 602 pass through voids between scintillator-blocks in the upper-layer and enter in scintillator-blocks that are part of the downstream layer to participate in the image generated by this detector module. Each of the scintillator-elements is attached to a visible-light sensor (not shown explicitly in this figure) such that visible-photons generated at X-ray absorption can be converted into electrical-signals and the electrical-signals further processed in order to achieve imaging.

DESCRIPTION OF THE INVENTION

It is an object of this invention to disclose the design of a scintillator-block that can be used alone or as part of arrays for X-ray detection and X-ray based imaging. The benefits of this design are: efficient X-ray detection, high position-resolution, high energy-resolution and significant reduction in the fraction of scattered X-rays detected.

In one embodiment the scintillator-block is shaped with a channel or cavity drilled or otherwise provided from the top-surface, preferably perpendicular to this surface, along the direction of the incoming radiation. The cavity width and depth as well as the block width and height will be machined in accordance with the application requirements and with the physical-properties of the scintillator-material being used. Typical dimensions of the basic scintillator-block belong, preferably, in the range from 0.2 mm to roughly 25 mm.

The following considerations are made with reference to FIG. 2A.

X-rays 200 exit the subject or the object to be imaged and enter the scintillator via the cavity 201. The X-rays may interact with the scintillator-material along the path AB and then along the pass BC. The distance $d_1$ between locations A and B may be chosen based on user-defined criteria. One possibility is to require that at least a certain percentage $p_1$ of the number of incoming photons with energy $E_1$ is absorbed. Given the scintillator specific-mass $\rho$ and the photon absorption-coefficient at this energy, $\mu_{E1}$, one estimates $d_1$ as:

$$d_1 = -\frac{\ln(1 - p_1)}{\rho \cdot \mu_{E_1}}$$

In a similar manner one estimates the distance $d_2$ as the distance required to absorb a fraction $p_2$ of the fluorescence-photons of energy $E_2$ within the scintillator material. This distance is also equal to the minimum cavity-depth "h":

$$h = d_2 = \left(-\frac{\ln(1 - p_2)}{\rho \cdot \mu_{E_2}}\right)$$

It follows that the minimum block-height and the minimum block-width are, respectively:

$$H = d_1 + 2 \cdot d_2$$

$$W = w + 2d_2 = w + 2 \cdot \left(-\frac{\ln(1 - p_2)}{\rho \cdot \mu_{E_2}}\right)$$

Given the scintillator-block shape and the condition $w < d_2$ the solid-angle available for escape of fluorescence-photons from the vicinity of the location A is minimized. Given the scintillator-block width, escape of fluorescence-photons emitted along the path AB is minimized too. The modified embodiment illustrated in FIG. 2B comprises the additional cavity 205. The second cavity further improves energy-resolution as it prevents X-ray interactions along the path BC, a region where fluorescence-photon escape is more probable.

All steps that prevent fluorescence-photon escape lead to a maximization of the energy deposited by the X-ray photon in the scintillator-block and improved energy-resolution.

Figure 3A:
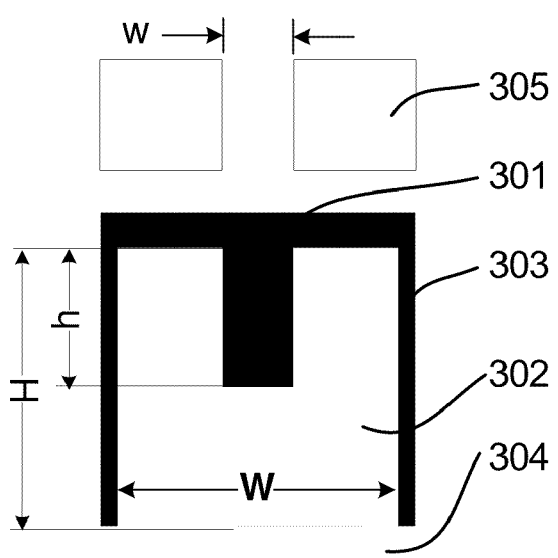
Figure 3B:
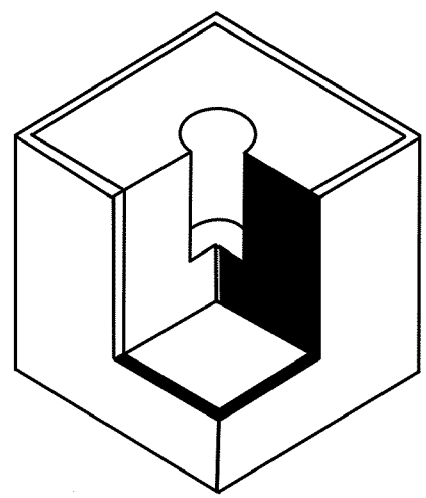

Another preferred embodiment is described in FIG. 3A. The plate 305 made of high-Z material (like tungsten, lead, copper or tantalum) is placed above the scintillator-block. The plate is provided with a perforation in registration with the opening of the cavity 301. The presence of a plate 305 enhances the fraction of the X-ray flux that enter the scintillator through the perforation and the cavity vis-à-vis the fraction that passes directly through the plate and into the scintillator. The amplitude of this effect is a function of plate thickness and material. The cavity and the perforation should be preferably of the same width and shape.

It is preferred that cavities are filled with optically-clear epoxy-glue or with $TiO_2$ filled epoxy-glue to achieve mechanical-strength and prevent loss of visible photons.

It is further recommended that scintillator-elements be coated with a layer made of light-reflecting material for efficient transfer of visible-light photons to the attached photodiode. Materials appropriate for this task are thin aluminum sheet and $TiO_2$ filled epoxy.

Alternatively, if the scintillator-material is a column-grown type scintillator there is no need for a light-reflecting coating.

Most scintillator-materials, for instance CsI (T1), can be cut into millimeter and sub-millimeter sized blocks. Many companies, among them Marketech International, Port Townsend, Wash., USA and Bicron, Solon, Ohio, USA, offer arrays of such small scintillator-blocks separated by thin light-reflecting septa. The block can undergo further processing, mechanical, chemical or ablation with high-intensity laser beams, to provide the cavity prescribed in this invention.

People familiar with the art will appreciate that by changes of the cavity-width "w" and of the scintillator-block width "W" one can achieve control of both spatial-resolution and energy-resolution. Together with that one finds that the geometric fill-factor is significantly smaller than 100%. For the block described here the upper-limit for the geometric fill-factor is:

$$\text{FillFactor} = \left(\frac{w}{W}\right)^2 = \left[\frac{w}{w + 2 \cdot \left(-\frac{\ln(1-p_2)}{\rho \cdot \mu_{E_2}}\right)}\right]^2$$

The competition between fill-factor and energy-resolution is not unexpected since high energy-resolution implies a $p_2$ value close to 100% while large fill-factor values are reached as $p_2$ approaches 0%.

It is another object of this invention to provide advantageous ways to assemble scintillator-elements into planar or staggered arrays suitable for X-ray based imaging.

Figure 4:
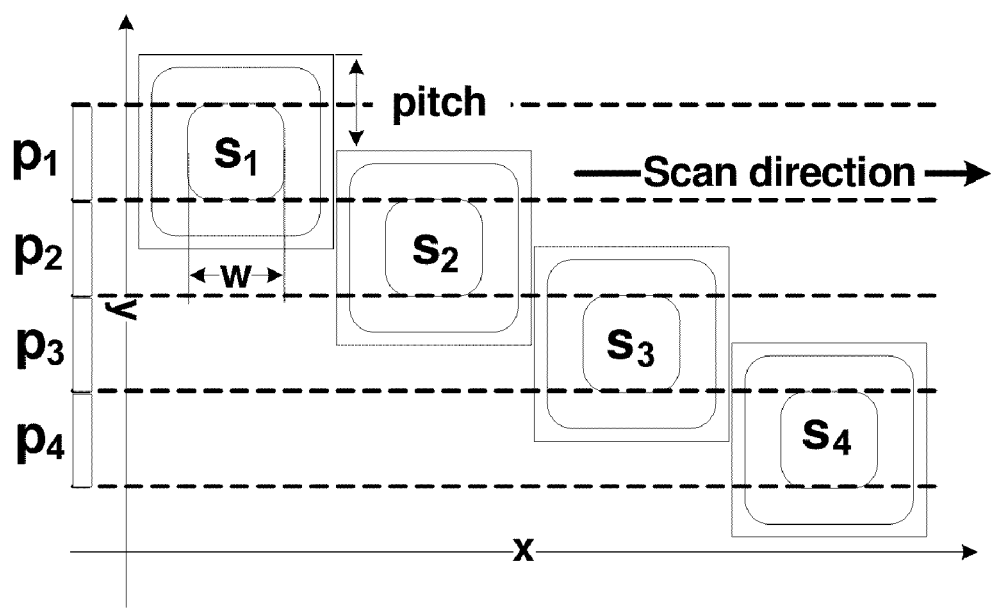

A first exemplary arrangement is illustrated in FIG. 4. Scintillator-blocks are distributed such that their projections along the x-axis are adjacent or slightly overlapping. In a preferred configuration the cavities have a rectangular cross-section and are arranged at a pitch equal to the cavity width "w". The object to be scanned travels in-between the X-ray source and the detector or the detector is moving and scans the X-ray flux exiting the stationary object. The position-resolution along the y-axis is defined by "w" while the position-resolution along the x-axis is defined by the product between scan-speed and signal integration-time.

Another exemplary arrangement comprises an array of scintillator-blocks and a perforated plate made of high-Z material placed upstream the scintillator-blocks. The scintillator-blocks may be arranged at fixed or variable-spacing, as a planar array or as a staggered array. The plate-perforations are in registration with the openings of the cavities in each scintillator-block.

Each scintillator-block has a light-sensor attached to it and electronics-circuitry attached to the light-sensor. The electrical-signal processing will typically consist of amplification, shaping, integration and digitization. The detection of one or several X-ray photons by a scintillator-block is converted into a number which is further associated to an image-pixel.

If the detector-system is designed for "integration-mode operation" the pixel-value is the measure of the total-energy deposited by the detected photons that pass through a plate-perforation and the associated cavity and are detected in scintillator-material 285 downstream the cavity. If the detector-system is designed for "single-photon counting" each pixel-value is associated with two or more numbers representing the spectrum of the X-ray photons detected at each location.

Figure 5:
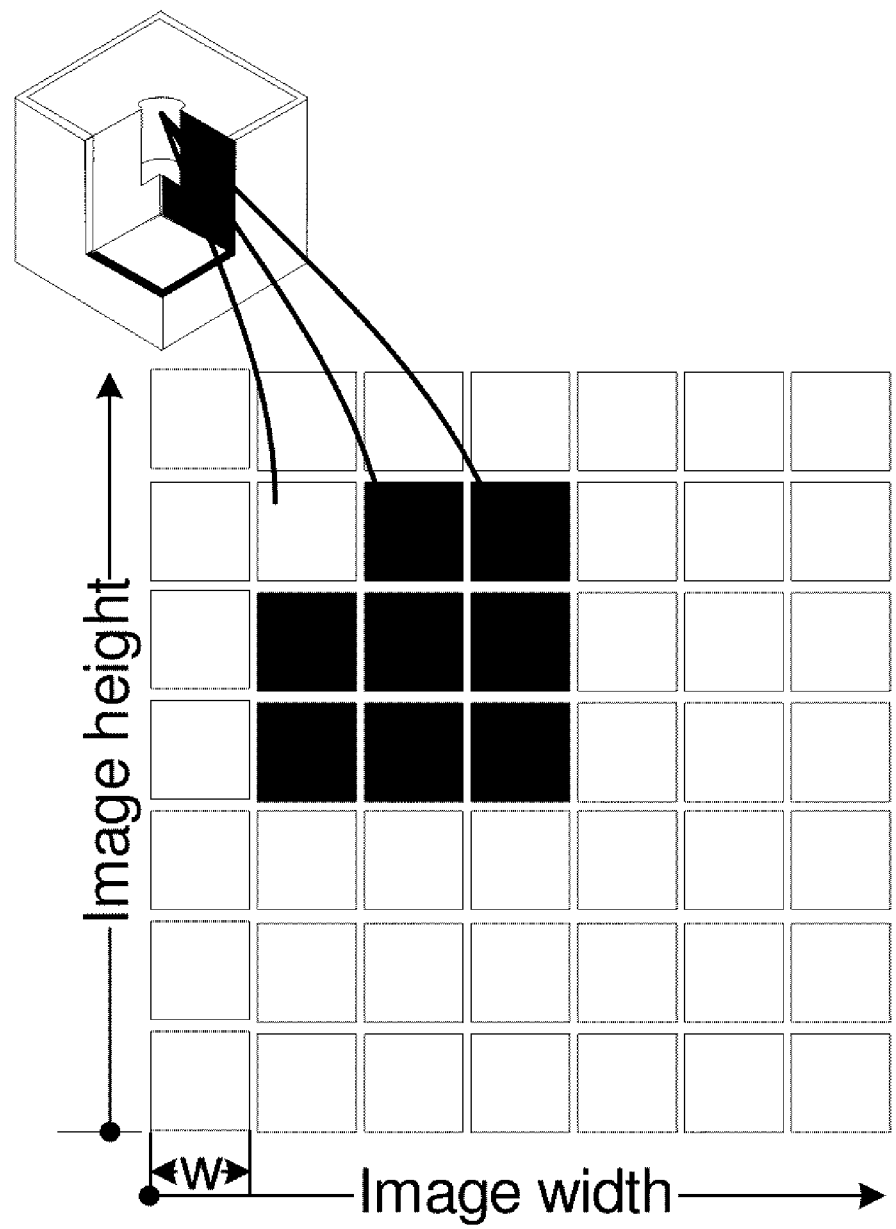

Within a single exposure the array-sensor measures only the values associated with a subset of the image pixels. These are the dark-colored pixels indicated in FIG. 5. By moving the detector in small steps "w" and with repeated exposures one can complete the process of image-acquisition. FIG. 5 illustrates the particular case where each single scintillator-element has to perform nine measurement steps to achieve a complete image.

Figure 6:
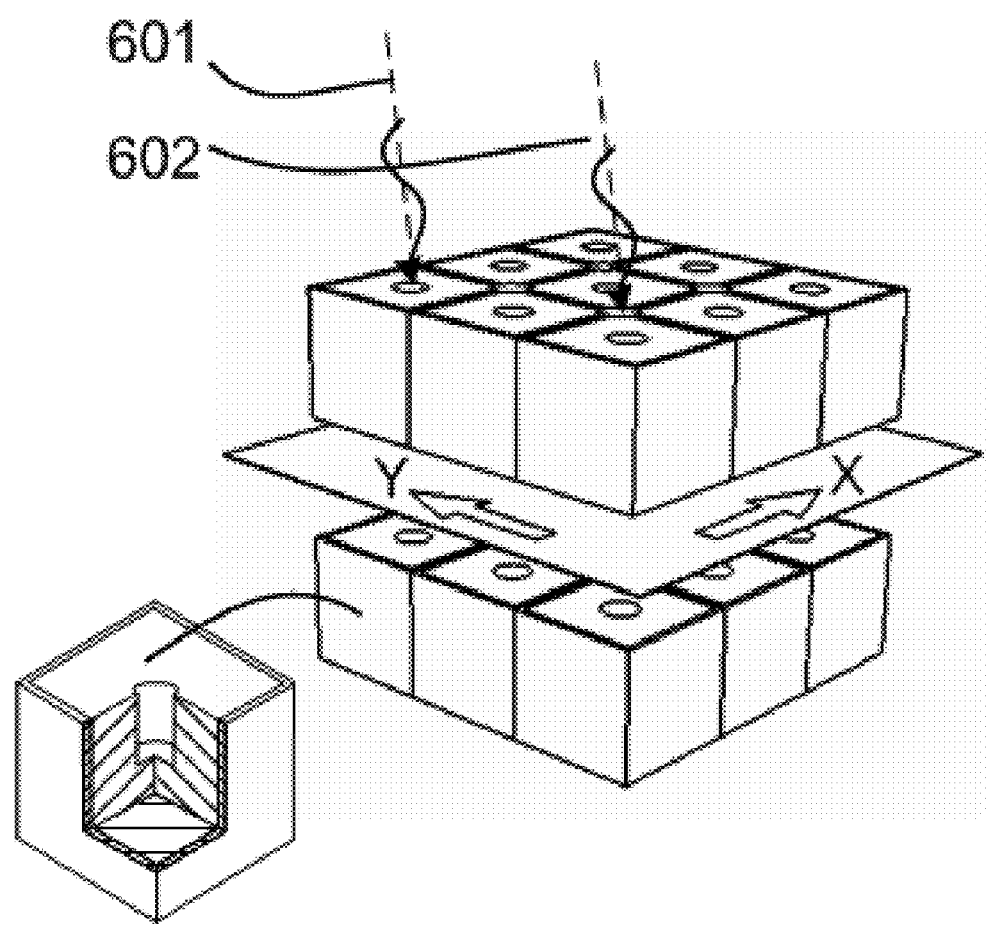

In yet another exemplary assembly, illustrated in FIG. 6, two arrays, each one comprising a plurality of scintillator-blocks, are placed one above the other such that prepared channels or voids between scintillator-blocks in the upstream array are in registration with cavities in the scintillator-blocks of the downstream layer. Each of the scintillator-elements is attached to a visible-light sensor (not shown explicitly in this figure) which converts the energy of visible-photons generated at X-ray absorption into electrical-signals.

The use of a multilayered assembly significantly increases the total system fill-factor.

What I claim as my invention is:

1. A scintillator block attached to a photodiode, the scintillator comprising a cylindrical cavity extending from the top surface towards the block-center, the cavity axis being substantially perpendicular to said top surface and the scintillator-block being coated with or surrounded by a layer of light-reflecting material which directs the light generated through X-ray absorption towards the uncoated surface which is attached to the photodiode.

2. The scintillator block according to claim 1, covered by a plate made of lead, tungsten, copper or other X-ray highly-absorbing material, the plate displaying a perforation located above the cavity's opening, said perforation being of similar size and shape as the cavity's cross-section.

3. The scintillator block according to claim 1, wherein the scintillator-block cavity is filled with a material that is transparent to light or reflecting light, said material being also substantially transparent to X-ray radiation.

4. A plurality of scintillator-blocks according to claim 1, assembled to form an X-ray detector and covered by a perforated-plate made of lead, tungsten, copper or any other X-ray highly-absorbing material, each perforation being placed in registration with a cavity-opening so that X-ray photons passing through a perforation and along the subsequent cavity enter the scintillating-material and can be detected.

5. The scintillator-block according to claim 1, wherein the scintillator-block is provided with an additional cylindrical cavity, coaxial with the first cavity, separated from the first cavity and extending from the bottom block-surface towards the block center.

6. The scintillator-block according to claim 1, used in computed-tomography imaging.

7. The scintillator-block according to claim 1, shaped as a block of rectangular or hexagonal cross-section.

8. An X-ray detector comprising a scintillator-plate, with a perforated metal-plate, wherein the scintillator-plate is provided with cylindrical cavities that originate from the scintillator-plate top-surface, the cavities being substantially perpendicular to said top-surface and the cavity-length being smaller than half the scintillator-plate thickness, and, wherein, the perforated metal-plate is made of lead, tungsten, copper or other highly-absorbing X-ray material and each metal-plate perforation is located above a scintillator-cavity opening.

9. The X-ray detector according to claim 8, performing an oscillatory motion in a plane perpendicular to the direction of impinging X-ray flux, with the maximum detector displacement being substantially equal to the size of the distance between neighboring cavities.

10. The X-ray detector according to claim 8, used in computed-tomography imaging.

* * * * *